(12) United States Patent
Sutter et al.

(10) Patent No.: US 6,421,159 B1
(45) Date of Patent: Jul. 16, 2002

(54) MULTIPLE BEAM LASER MARKING APPARATUS

(75) Inventors: Leroy V. Sutter, Irvine; Richard Blackburn, Foothill Ranch, both of CA (US)

(73) Assignee: The Domino Corporation, Dover, DE (US)

( * ) Notice: Subject to any disclaimer, the term of this patent is extended or adjusted under 35 U.S.C. 154(b) by 0 days.

(21) Appl. No.: 09/242,849

(22) PCT Filed: Aug. 29, 1997

(86) PCT No.: PCT/GB97/02334

§ 371 (c)(1),
(2), (4) Date: Feb. 25, 1999

(87) PCT Pub. No.: WO98/11495

PCT Pub. Date: Mar. 19, 1998

Related U.S. Application Data

(60) Provisional application No. 60/025,915, filed on Sep. 11, 1996.

(51) Int. Cl.[7] .................................................. G02B 26/02
(52) U.S. Cl. ...................................................... 359/223
(58) Field of Search .............................. 372/9; 359/204, 359/196, 201, 211, 618, 205, 207, 223; 219/121.71

(56) References Cited

U.S. PATENT DOCUMENTS

| 4,652,722 | A | | 3/1987 | Stone et al. |
| 5,168,401 | A | | 12/1992 | Endriz |
| 5,841,101 | A | * | 11/1998 | Nishiwaki ............... 219/121.71 |
| 5,963,354 | A | * | 10/1999 | Shiraishi et al. ............. 359/204 |
| 6,043,884 | A | * | 3/2000 | Curbelo ...................... 356/502 |
| 6,208,463 | B1 | * | 3/2001 | Hensen ........................ 359/486 |

FOREIGN PATENT DOCUMENTS

| EP | 0 538 044 | 4/1993 |
| WO | WO 89 12369 | 12/1989 |

* cited by examiner

Primary Examiner—James W. Davie
(74) Attorney, Agent, or Firm—Dykema Gossett PLLC (57) ABSTRACT

A laser marking apparatus has a number of individual laser devices (1) mounted at angles to one another. The output ends (2) of the laser devices are disposed closely adjacent to one another and a number of laser beam redirectors (5) are disposed to intercept the laser beams (3) emitted from the laser output ends (2) so as to extend the length of the laser beam paths and to decrease the angle between said laser beams (3).

10 Claims, 13 Drawing Sheets

SECTION C-C
ROTATED 45.32°

SECTION D-D
ROTATED 45.71°

MULTIPLE BEAM LASER MARKING APPARATUS

Cross Reference to Related Application:

This application is related to provisional application Ser. No. 60/025,915 filed Sep. 11, 1996, the teachings of which are incorporated herein by reference.

The present invention relates to lasers and, more particularly, to the optics of a laser system for use in marking and coding applications.

Background of the Invention

Lasers suitable for use in such applications have been described in U.S. Pat. No. 4,618,961, U.S. Pat. No. 4,891,819 and U.S. Pat. No. 5,095,490. Additionally, in U.S. Pat. No. 4,652,722 there is described a laser apparatus utilising a plurality of coherent laser beams in conjunction with fixed reflecting means, beam tubes and a focusing lens, to providing marking indicia or permanent alteration of substrate surfaces. Claim 1 of U.S. Pat. No. 4,652,722 is directed to features which enable the optical path to be shortened and the specification describes how the optical path can be shortened using the reflecting means.

One of the main problems in building a compact and commercially viable laser marking system utilising multiple laser channels, is to position the laser channels in such a manner as to reduce the physical size of the channel assembly whilst simultaneously simplifying the optical configuration necessary to provide the required optical marking characteristics. In general, the physical size of individual lasers does not readily allow one to obtain simultaneously the optical spacing and angular relationships between the laser required for optimum optical performance. In U.S. Pat. No. 4,652,722 the inventors teach that one possible solution to this problem is to place the lasers in a near-parallel orientation and then re-direct each beam optically to both shorten the optical paths and to set the desired angular relationship between the individual laser beams.

However, the above patent specification does not deal with the problem of providing a suitably small character size from multiple dots.

U.S. Pat. No. 5,168,401 &-WO-A-9604584 describe optical systems which relate to th[0085] collimatio[008e] o[0086] individua[008c] laser beams from laser diodes, but do not address the problems to which the present invention relates. EP-A-0538044 discloses a system similar in nature to U.S. Pat. No. 4,652,722 & U.S. Pat. No. 5,389,771 discloses an apparatus for folding a single beam emitted from a point source. None of these specifications is considered to be of particular relevance to the present invention. Also, WO8912369 discloses a multi-beam laser system.

According to the present invention, a laser apparatus comprises a plurality of individual lasers, each of the lasers having an output end from which a laser beam is emitted, and the lasers being mounted at angles to one another whereby their beams cross, wherein said laser output ends are disposed closely adjacent to one another; and a plurality of laser beam redirectors are disposed to intercept the laser beams emitted from the laser output ends, said laser beam redirectors being disposed to extend the length of the laser beam paths and decrease the angle between said laser beams, said laser beam redirectors being located between the laser output ends and a crossing point at which the beams cross.

Summary of the Invention

By this means the resulting optical system can produce a plurality of marks properly spaced to produce alpha-numeric, graphic and/or machine-readable marks on moving substrates whilst providing a very compact system which can be fitted in relatively small spaces typically provided on production lines and the like.

The laser beam redirectors are preferably mirrors or refractive optical prisms.

Steering mirrors could be added to the beam paths to vary the angles between the laser beams, being steerable by electrical signals as desired.

A lens may be provided to focus the laser beams on to the target, the lens being preferably located between the point at which the laser beams cross and the target surfaces at a distance f from the crossing point which is the focal length of the lens.

According to the present invention, there may also be provided a laser beam splitting device for directing the laser beams to a plurality of targets, and the respective path lengths of the laser beams between the laser beam redirectors and each of the lenses, preferably provided as above for each of the targets, are preferably equal.

Brief Description of the Invention

Example apparatus according to the present invention will now be described with reference to the accompanying drawings in which.

Description of the Invention

Figure 1:
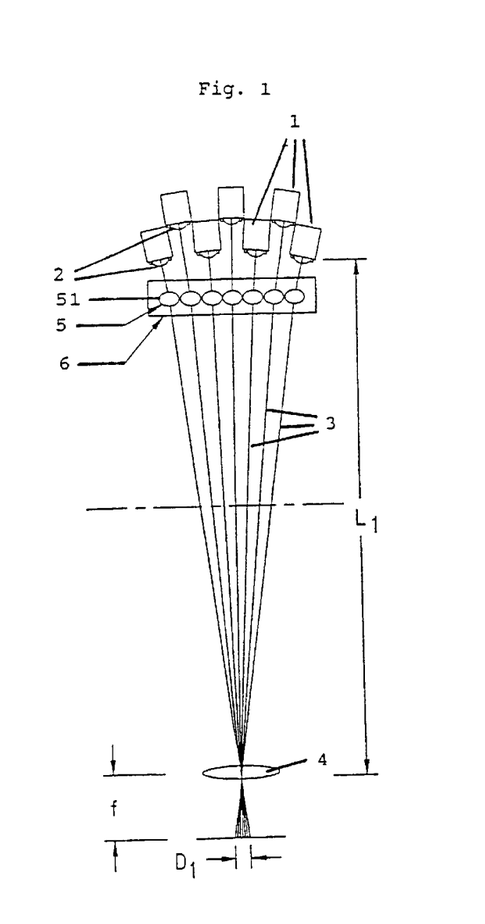
FIG. 1 illustrates a first example of the apparatus in plan view.
Figure 3:
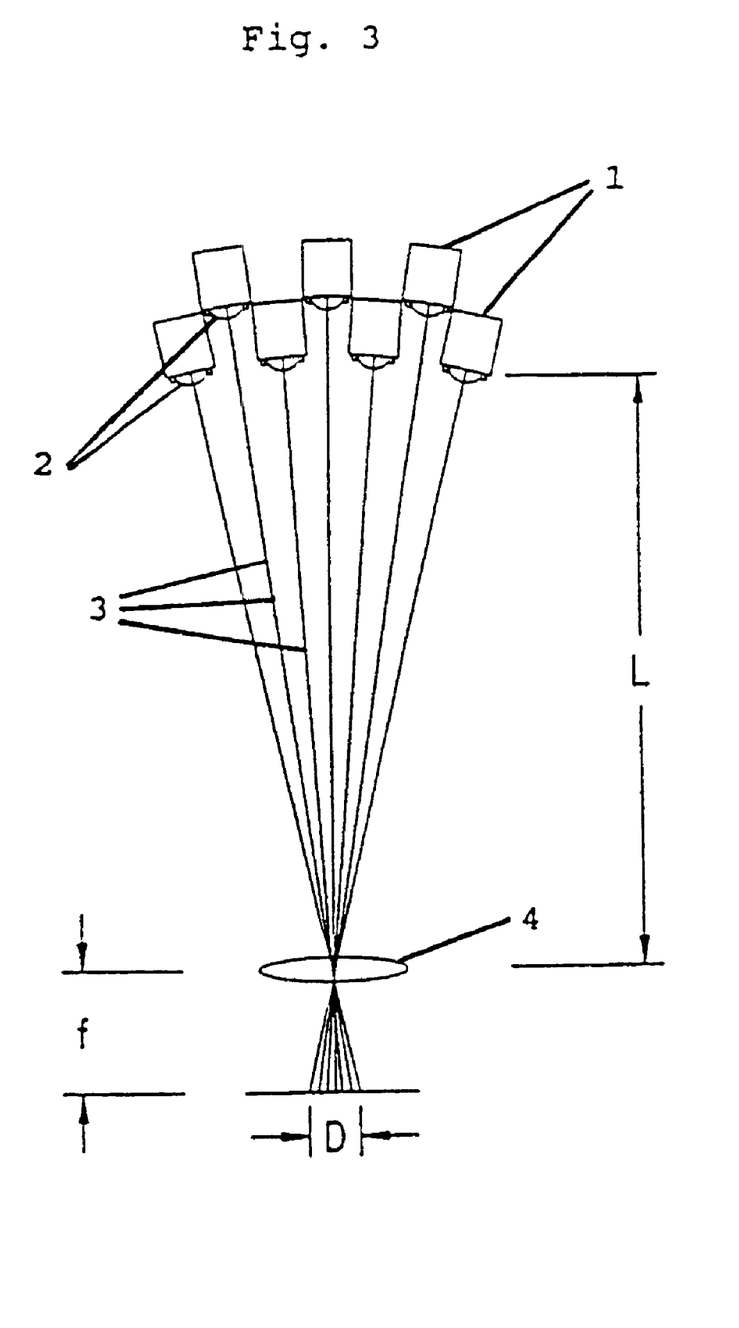
FIG. 3 illustrates, for comparison purposes, a laser marking system without the laser beam redirectors of the present invention.

In order to produce a compact laser marking or coding device, individual lasers 1 are closely located with their respective output ends 2 disposed adjacent to one another and in a staggered, overlapping relationship as shown in FIGS. 1 and 3. As shown in FIG. 3, the resulting angles between the respective laser beams 3 cause the beams, once they have been passed through the usual focusing lens 4, to be spaced apart from one another over a total distance D at an appropriate distance f from the lens 4. This may be too large for many marking applications.

Figure 2:
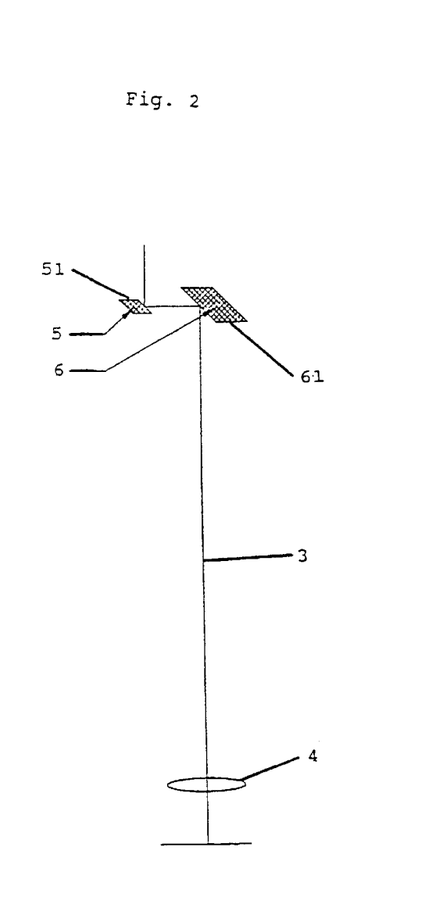
FIG. 2 illustrates the same apparatus in side elevation.

FIGS. 1 and 2, by comparison with FIG. 3, show how plural mirror assemblies 5, 6 can be used to extend the overall path of the laser beams 3 from L to $L_1$, at the same time reducing the angle between the respective laser beams 3 and thus producing a set of beams which have a total separation distance $D_1$ which is considerably less than the total separation D of the apparatus shown in FIG. 3. The first re-directing mirror assembly 5 has plural mirrors 51 which each have appropriately different reflection angles to re-direct the set of beams 3 to respective areas of a second re-directing mirror assembly 6 which has a single 45° angled mirror 61 which then reflects the beams 3 towards the focusing lens 4.

The geometry of the configuration and the focal length of the lens 4 determine the dot spacing and dot size of the marks that can be produced on the target substrate (as is described below in connection with FIG. 8 and 9) and the separation of the marking dots, either individually or in groups may be adjusted by changing the angle between the laser beams 3 at the focusing lens 4.

Figure 4A:
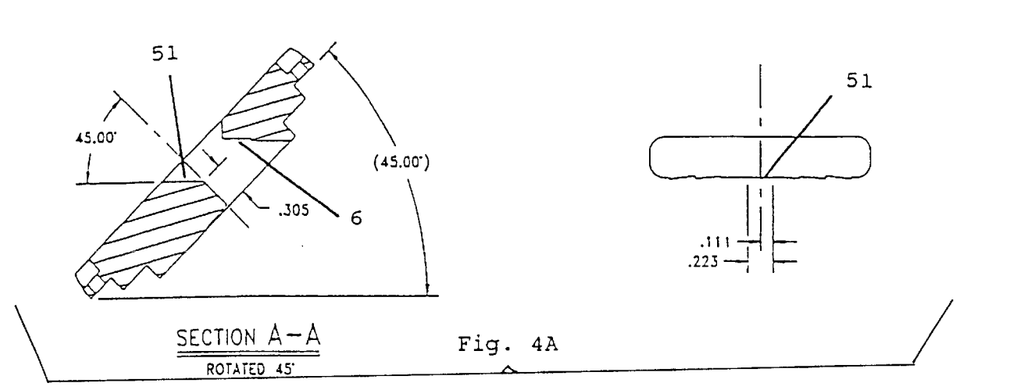
FIGS. 4A–F illustrate details of the mirrors used in the system of FIG. 1.
Figure 4B:
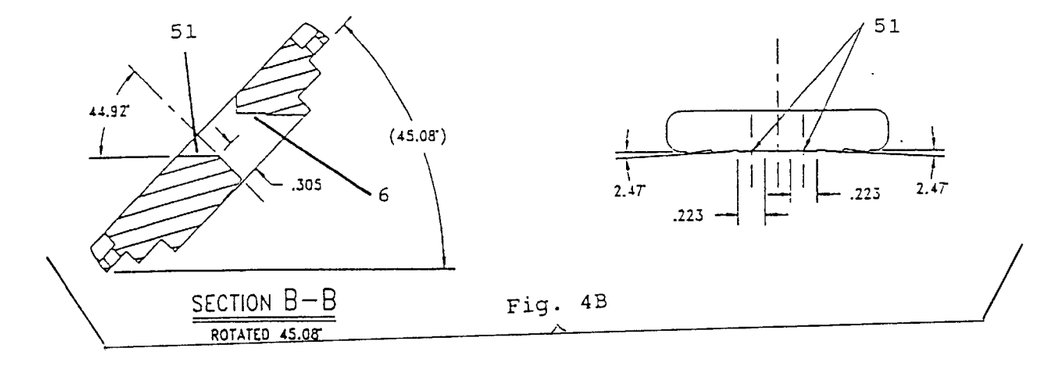
Figure 4C:
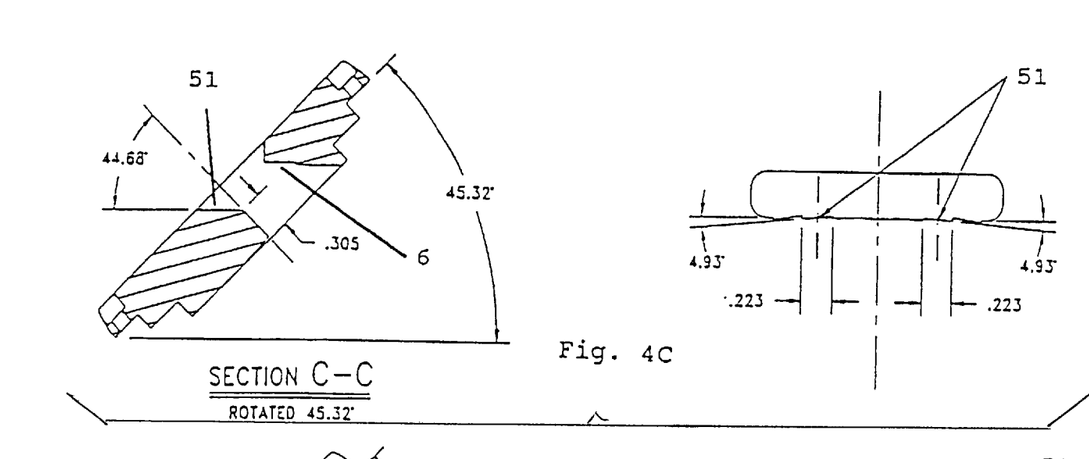
Figure 4D:
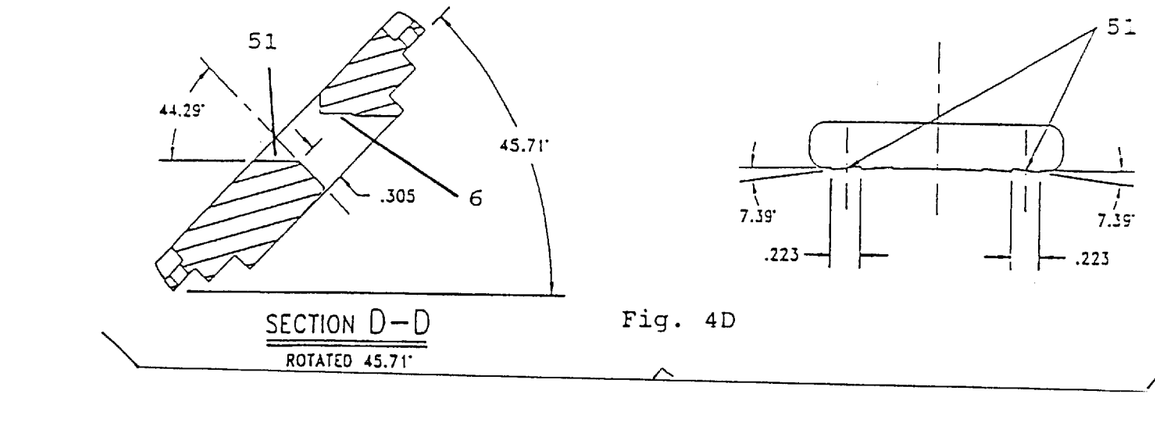
Figure 4E:
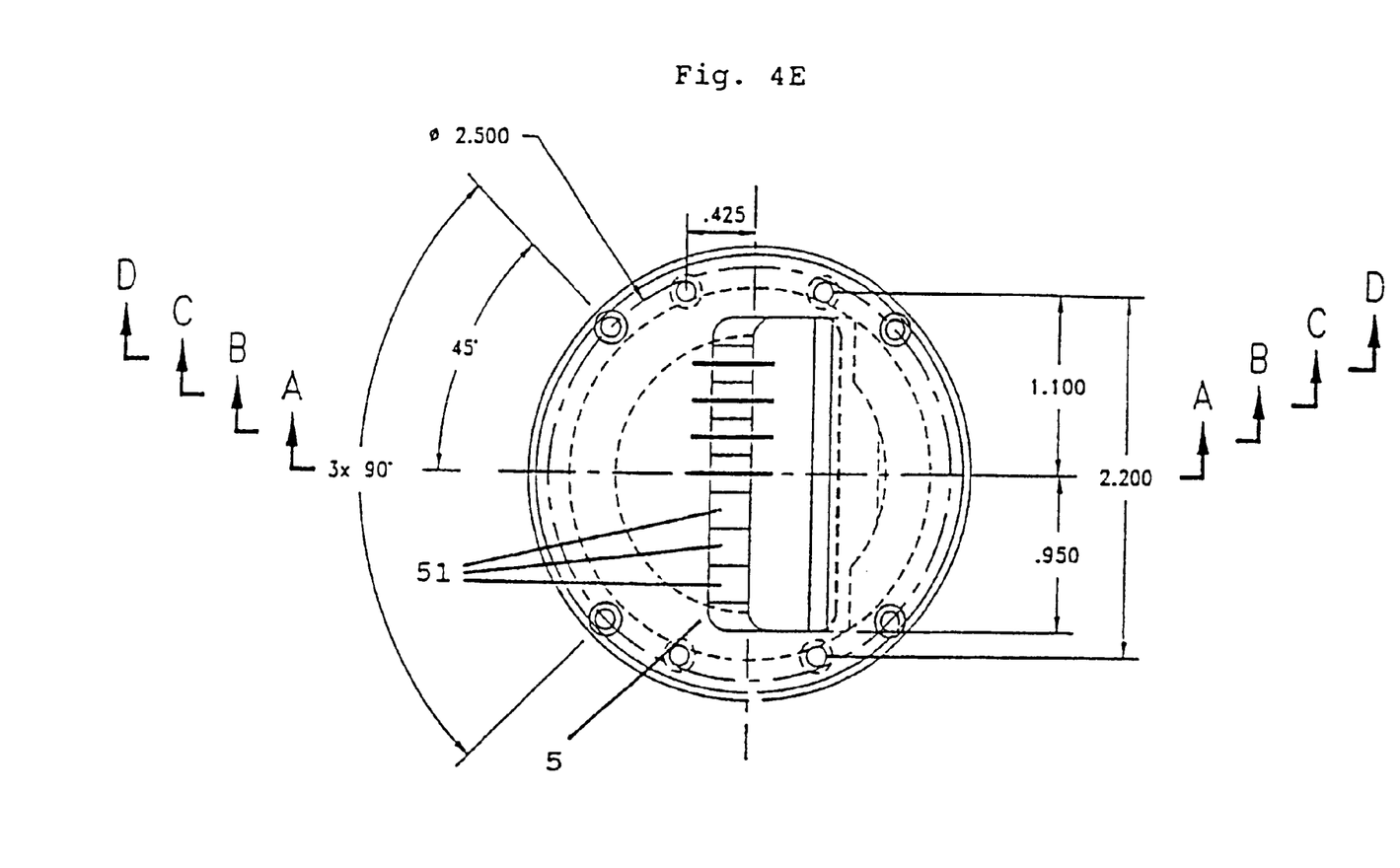
Figure 4F:
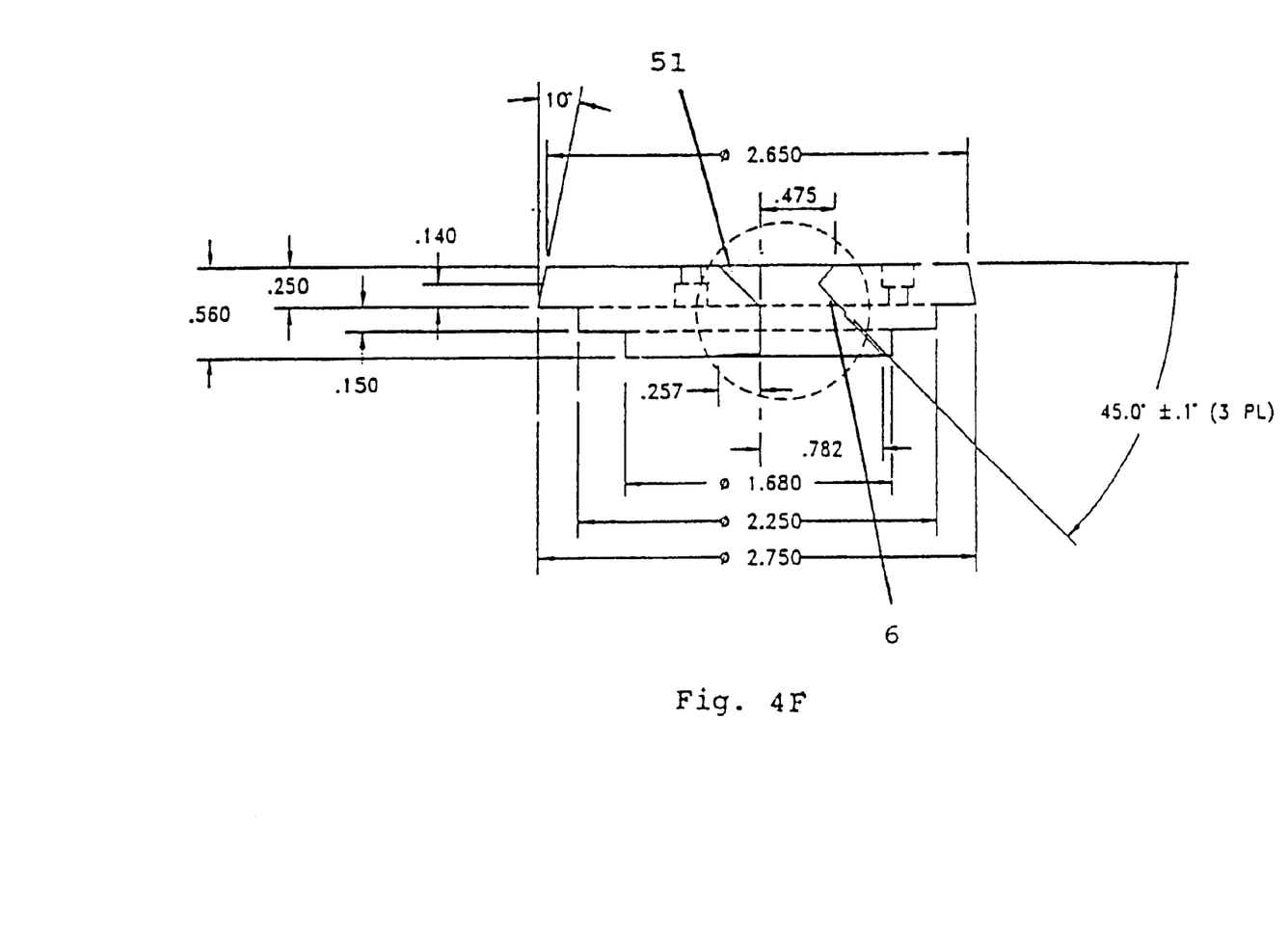

The separation angle of the laser beams 3 emitted from the lasers 1 is initially 4.33° and is changed to between 0.2° and 1.0° (0.8° for the configuration shown in FIGS. 4A to 4F) by the individual mirrors 51 of the mirror assembly 5 which are shown in more detail in FIGS. 4A–F. FIGS. 4A to 4D show, diagrammatically in two seperate cross-sections perpendicular to one another at sections A—A, B—B, C—C and D—D of FIG. 4E respectively, the mirror surfaces which form the individual mirrors 51, their spacing and relative angles. The locations of each of these sections is illustrated in FIG. 4E, and FIGS. 4E and 4F show the mirror assembly 5 and 6, FIG. 4F being a cross-sectional view at 90° to FIG. 4E, with just one of the mirror surfaces 51 thus being shown.

Figure 5:
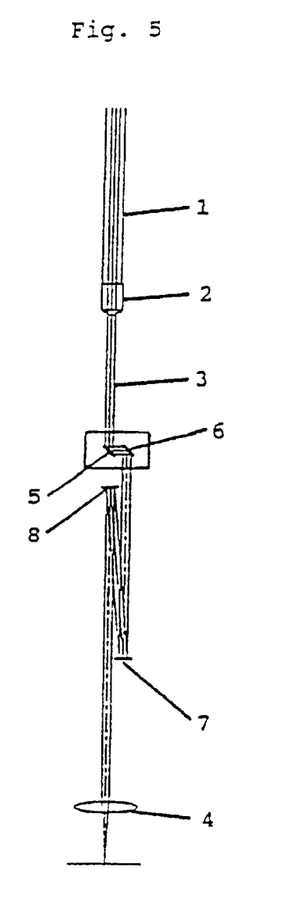
FIGS. 5, 6 & 7 illustrate second, third and fourth alternative embodiments of apparatus according to the invention.
Figure 6:
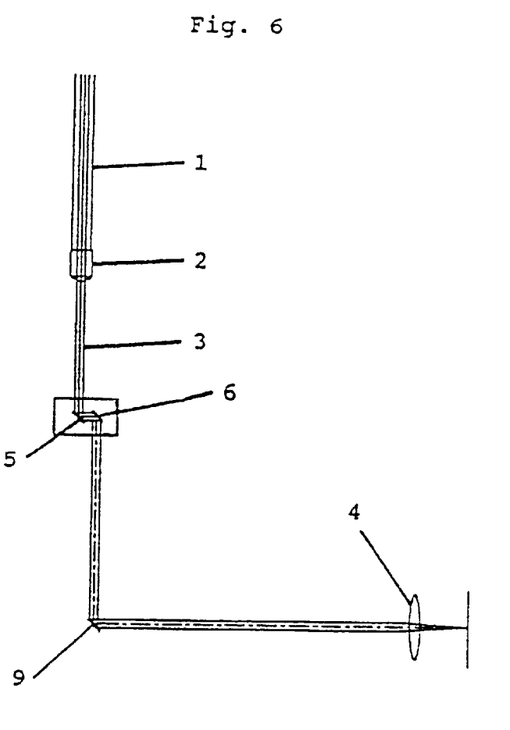
Figure 7:
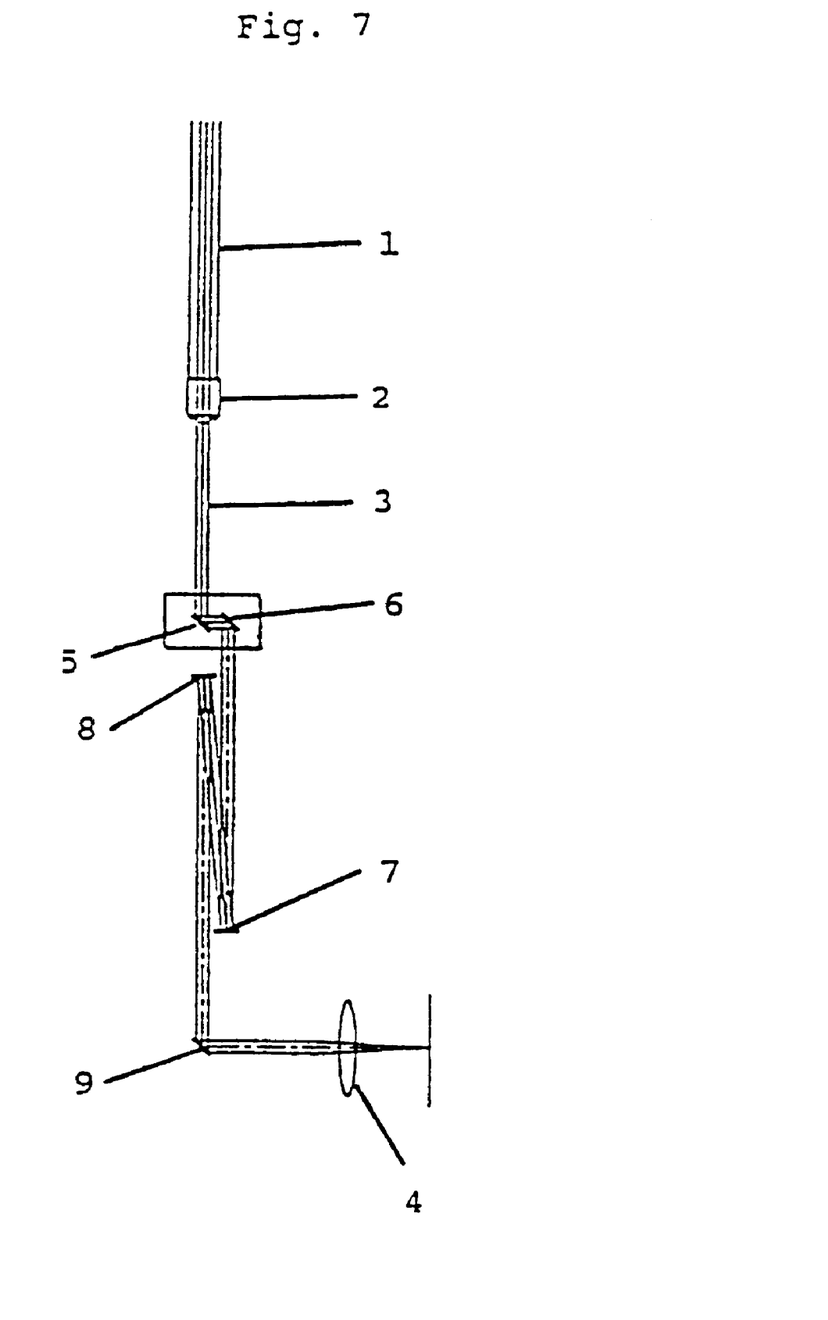

FIGS. 5, 6 & 7 illustrate alternative embodiments in side view. In FIG. 5 an additional, adjustable, mirror assemblies 7, 8 are employed to allow beam length adjustment separately from that resulting from beam angle adjustment provided by the mirror assemblies 5, 6. The FIG. 6 embodiment shows an additional mirror assembly 9 which re-directs the beams 3 transversely to the plane of their original direction and the FIG. 7 embodiment combines the features of the examples of FIGS. 5 and 6.

FIGS. 4A to 4C illustrate further detail of the mirror assemblies 5, 6.

The theory underlying the concept of the present invention is as follows and is described with respect to FIGS. 8 and 9.

Figure 8:
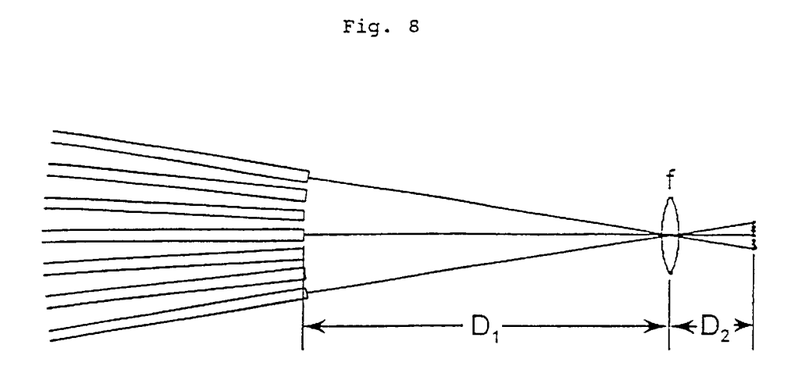
FIGS. 8 and 9 are beam diagrams to illustrate the underlying principles behind the invention.
Figure 9:
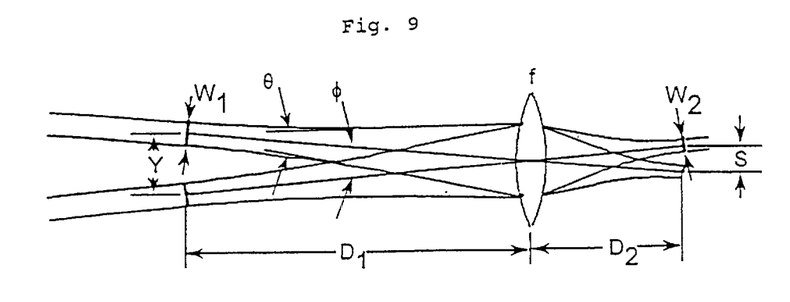

FIG. 8 illustrates the geometric configuration of a plurality of angled lasers a distance $D_1$ from a lens of focal length f and forming a series of focused laser spots at a near-planar surface a distance $D_2$ from the focusing lens. FIG. 9 illustrates the optical configuration of two adjacent lasers of FIG. 8 including diffraction effects. In FIG. 9, the adjacent lasers are at an angle $\phi$ to each other and are separated on centers at the closest points by a distance Y. Each laser beam exiting the laser aperture of inside diameter $W_1$ expands in the far-field of the exit aperture at angle $\theta$ and is focused by the lens of focal length f to a spot diameter of $W_2$ and is separated by a distance S from the adjacent laser spot.

According to standard optical theory for lowest order gaussian laser beams and using first order thin lens approximations, the following calculations can be made.

Firstly it is given from basic laser theory that the laser beam divergence for a laser beam exiting a laser aperture with gaussian beam-waist, $W_1$, is given by the relation:

$$\theta \approx (4\lambda)/(\pi W_1) \quad (1)$$

where $\lambda$ is the wavelength of the light exiting the waveguide and $\pi$ is the physical constant approximated by the value 3.14159.

For gaussian laser beams focused through a lens, the following relationships are readily derived and can be found in most standard texts on the subject:

$$W_2 = [(1/W_1^2)(1-(D_1/f))^2 + (1/(f\theta)^2)]^{1/2} \quad (2)$$

and $$_2 = f + [(D_1-f)f^2]/[(D_1-f)^2 + (\pi W_1^2)/(4\lambda))^2] \quad (3)$$

where $D_2$ is the distance from the lens to the minimum focused spot size, $W_2$, (the prime focus distance).

Finally for the normal conditions where the angle between laser channels is small, then the value of $\tan(\phi)$ is approximately equal to $\phi$ so that by simple geometry:

$$S \approx \phi D_2 \quad (4)$$

Thus from this set of equations one can derive the focused spot size, $W_2$, and spot separation, S for a given focused spot size, $W_2$, the prime focus distance, $D_2$, and spot separation, S, for given set of geometric parameters ($W_1$, $D_1$, and $\phi$) and optical parameters (f and $\lambda$).

Sample Calculations:

As a sample case, the following is given:

$\lambda = 10.6 \times 10^{-4}$ cm (carbon dioxide laser wavelength)
$f = 5.0$ cm
$W_1 = 0.40$ cm
$D_1 = 130$ cm
$\phi = 0.01$ radians Then from these values the following can be derived:

| | |
|---|---|
| $\theta = 0.0337$ radians | (from Equation 1) |
| $W_2 = 0.0116$ cm | (from Equation 2) |
| $D_2 = 5.1$ cm | (from Equation 3) |
| $S = 0.051$ cm | (from Equation 4) |

The above values would be typical for a seven dot character height of slightly over 3.0 mm where the character height, H, is equal to:

$$H = (N-1)S + W_2 \quad (5)$$

where N is the number of laser channels, S is the separation between dots at the minimum dot size plane (the prime focus plane, not necessarily the focal plane) and $W_2$ is the focused beam diameter at this plane. Now inserting Equation 4 into the above relationship one obtains:

$$H = (N-1)\phi D_2 + W_2 \quad (6)$$

where $\phi$ is the angle between laser channels going into the focusing lens and $D_2$ is the distance from the lens to the prime focus of the laser beams. In the focal plane of the lens where the lens is a distance f from the plane where the spot separation is measured, the simplification can be made of $D_2 = f$ so that the above equation simplifies to:

$$H = (N-1)\phi f + W_2 \quad (7)$$

This equation establishes the relationship between character height and both laser beam angle and lens focal length at the focal plane of the lens. It is the angle between the adjacent laser beams, $\phi$, which the mirror system changes in order to both lengthen the beam path to a commercially viable length while adjusting the beam separation angles to obtain the desired character height in Equation 3 above.

The above considerations also show that it is clearly desirable that a substrate to be marked is placed in the focal plane 21, as it is here that the laser beams 3 are most sharply focused, and the spot widths $W_2$ are smallest. However, other criteria may be taken into account to attain optimal positioning of the lens 4 in relation to the mirrors 6 and substrate.

Figure 10:
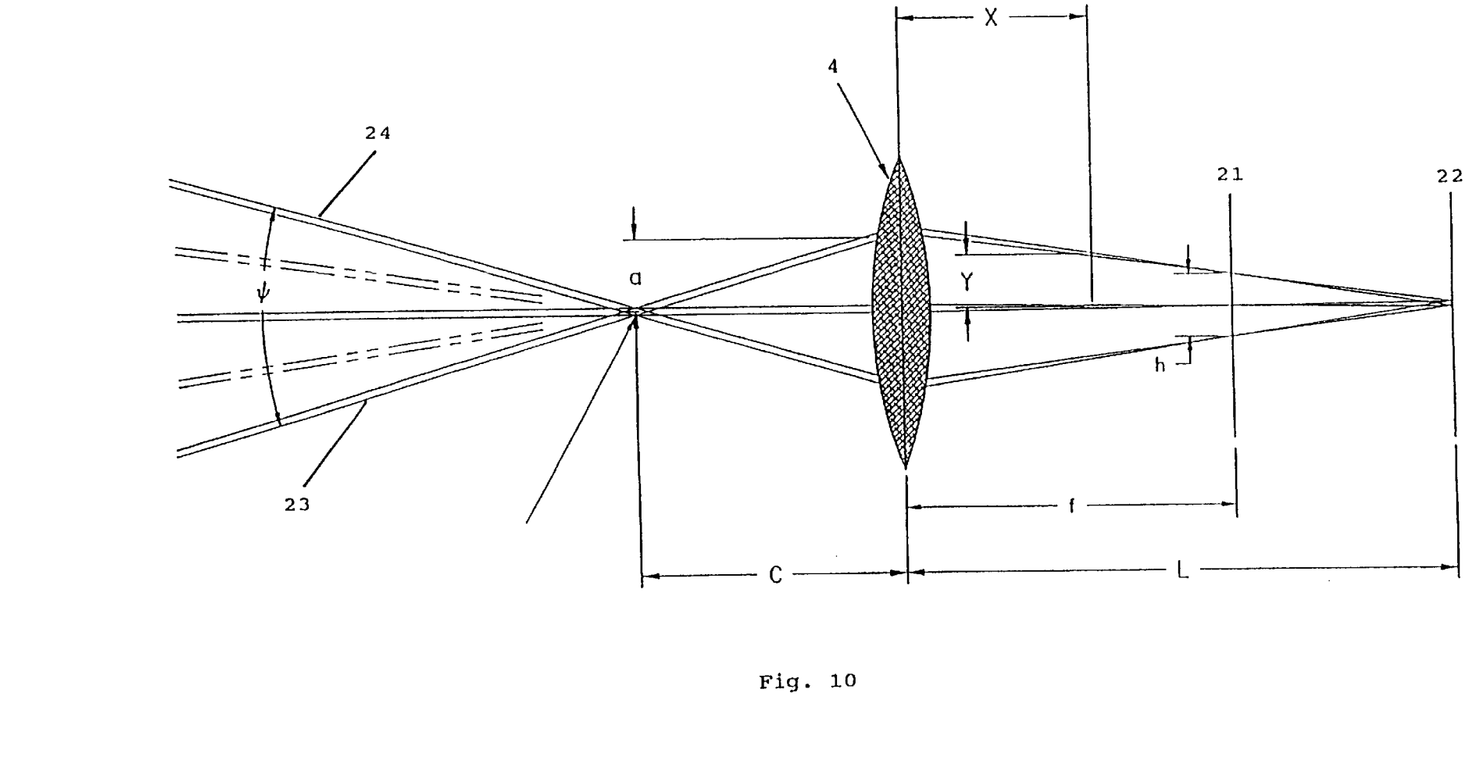
FIG. 10 illustrates a lens arrangement for focusing the laser beams.

Referring to FIG. 10 it can be seen that:

$$\psi=(N_{max}-1)\phi \qquad (8)$$

where $N_{max}$ is the total number of laser beams, and $\psi$ is the angle between the outermost laser beams 23 and 24.

It can therefore be appreciated from (7) and (8) that, if the dot width $W_2$ is ignored:

$$H \approx \psi f \qquad (9)$$

So, as $\psi$ and f are obviously independent of the distance C between the lens 4 and the beam cross-over point 20, the character height H at the focal plane 21 is also independent of distance C.

By comparing similar triangles, it can be seen that:

$$Y/(L-X)=a/L \qquad (10)$$

where L is the distance between the lens 4 and the point 22 where the laser beams converge, a is the radial distance from the optical axis of the lens 4 at which an outermost laser beam 23 is incident on the lens 4, and Y is the radial distance from the optical axis of the lens 4 to an outermost laser beam 23 at a point a distance X along the optical axis of the lens 4 from the lens 4 toward the point 22.

From the thin lens formula, it is known that:

$$L=Cf/(C-f) \qquad (11)$$

where C is the distance between the cross-over point 20 and the lens 4.

It can also be shown that for small angles:

$$a \approx C\frac{\psi}{2} \qquad (12)$$

From (10), the derivative of Y with respect to X is taken. The result can be combined with (11) and (12), to show that:

$$\frac{dY}{dX} = (f - C)\psi \qquad (13)$$

and so when f=C;

$$\frac{dY}{dX} = 0 \qquad (14)$$

This result indicates that when the lens 4 is placed a distance f, ie. the focal length of the lens, away from the beam crossover point 20, the character height H is constant near the focal plane. In other words, the change of character height with position in and out of the focal plane 21 can be made equal to zero by making the distances C and f equal.

This means that the apparatus can mark on a curved or uneven surface without a noticeable change in character height, providing a distinct commercial advantage.

Figure 11:
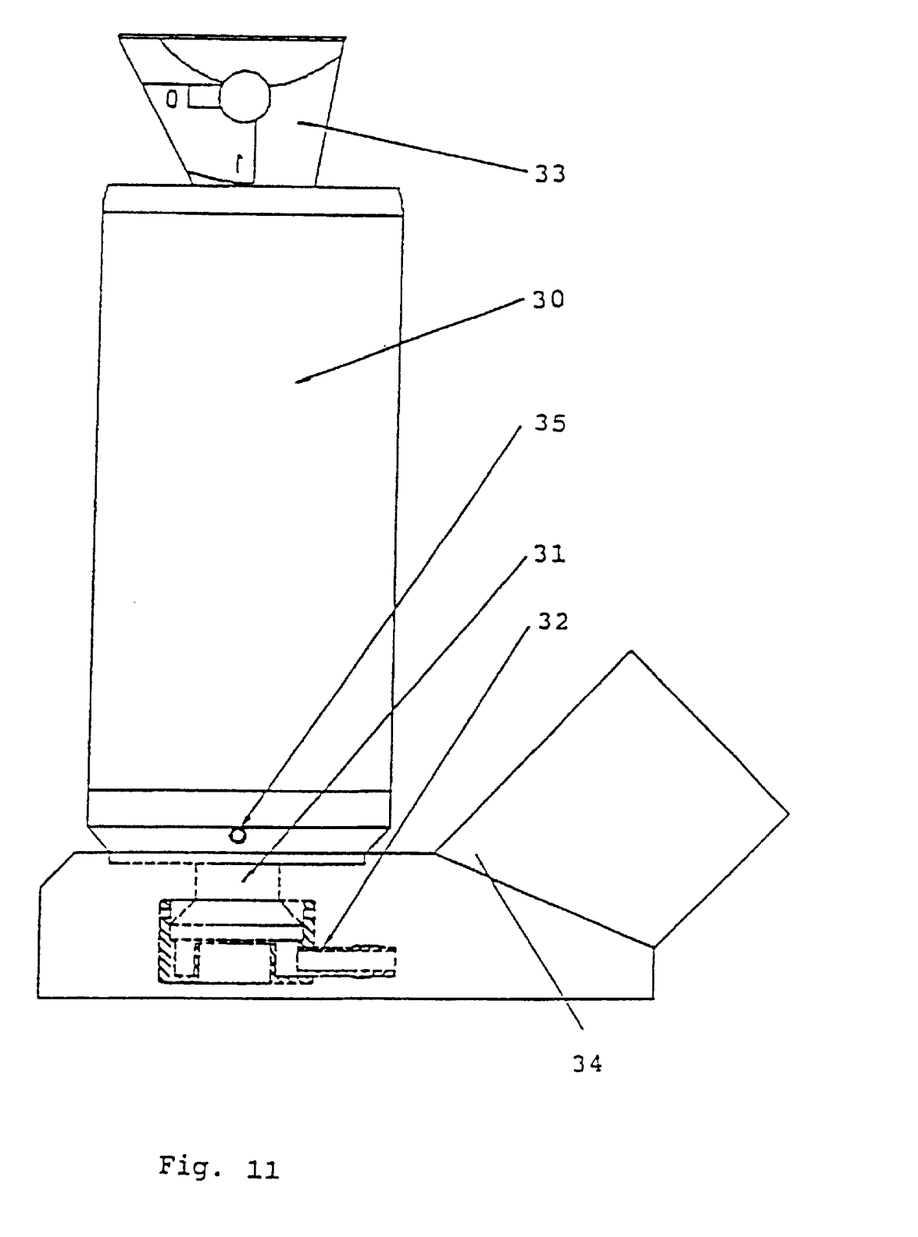
FIGS. 11 and 12 illustrate an example of a further embodiment of the invention.
Figure 12:
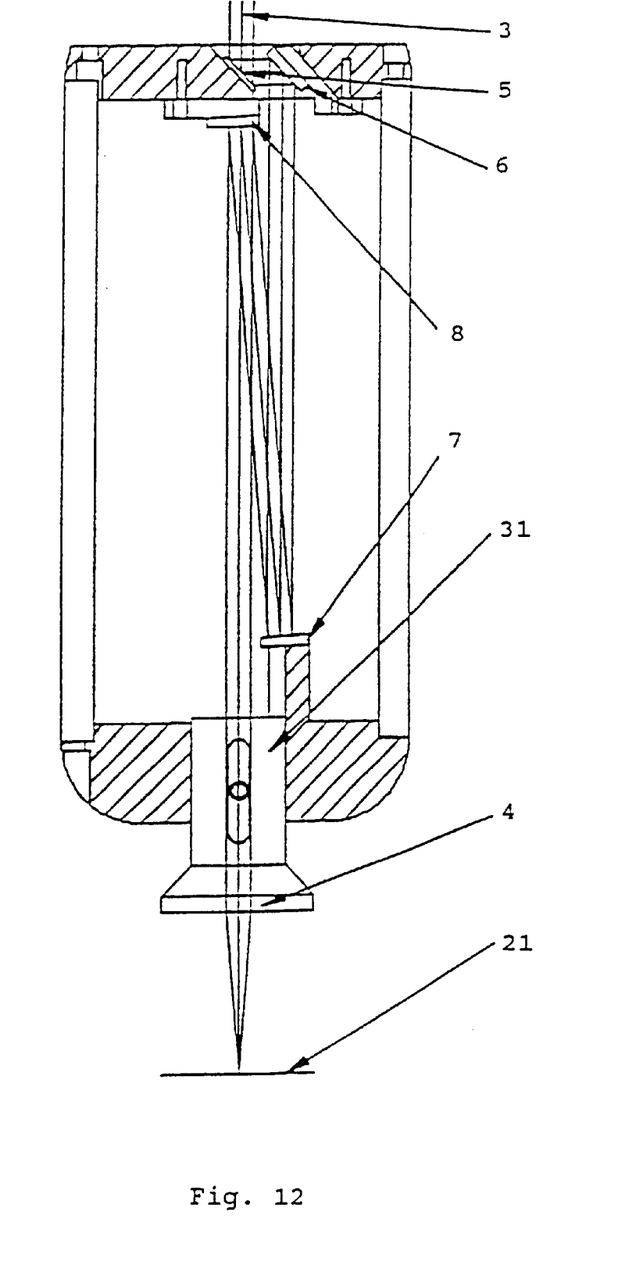

A further example of an embodiment of an apparatus incorporating these features is shown in FIGS. 11 and 12, and comprises a beam extender housing 30, a lens assembly 31, and an air nozzle assembly 32. Laser beams 3 are provided through a beam shutter assembly 33, and the laser output is shielded by a beam shroud 34 which acts to prevent personnel using the equipment being accidentally exposed to laser radiation. The beam shroud 34 also encloses the laser marking area in such a way that debris produced by the laser marking process can be sucked away through port 36 by vacuum cleaner apparatus (not shown).

The beam extender housing 30 is sealed to ensure that the mirrors 5, 6, 7, 8 remain clean and free of both environmental dirt and debris generated by the laser during the laser marking process. Clean, filtered air is circulated via an air nozzle assembly 32 to prevent debris and residue produced during the laser marking process from contaminating the focusing lens 4 located in the lens assembly 31. Fine tuning of the lens 4 can be carried out by adjusting the lens assembly 31 using the lens focus adjustment screw 35.

Figure 13:
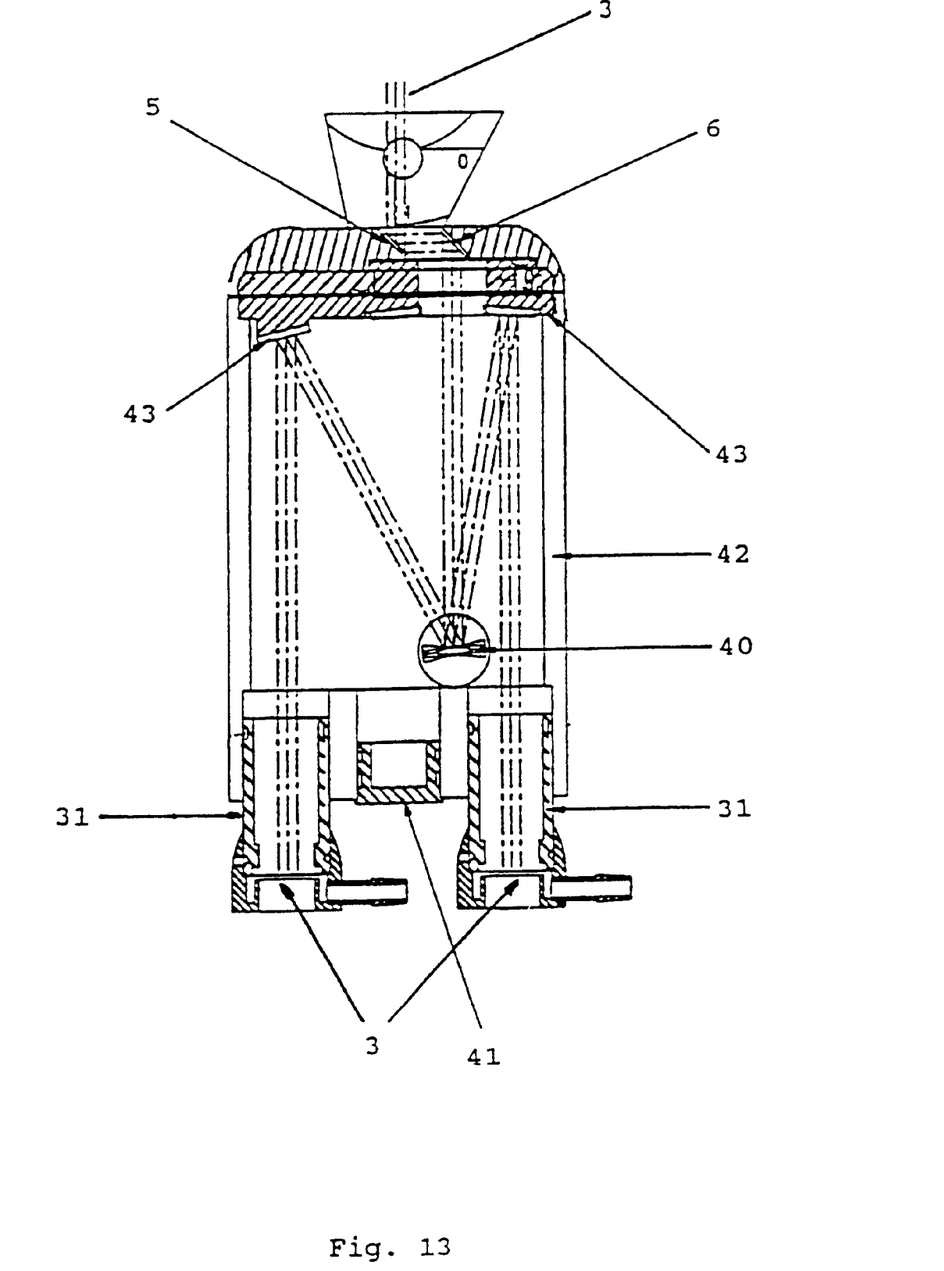
FIG. 13 illustrates an example of an embodiment of the invention providing two or more sets of laser beams for laser making.

Referring now to FIG. 13, embodiments of the invention may also incorporate a beam splitting device 40 which enables a single set of laser beams 3 to provide laser marking at more than one location. The multi-line apparatus illustrated in FIG. 13 is fitted with two lens assemblies 31, and a third lens assembly location is fitted with a plug 41. If the plug 41 is replaced with a lens assembly 31, the beam splitting device may further split the laser beams 3 to provide laser marking at three locations.

In operation, the laser beams 3 enter the multi-line beam extender housing 42 via mirror assemblies 5 and 6 which extend the overall path of the beams as described above. The beams are then incident on the beam splitting device 40, which comprises a mirror mounted on a rotary galvanometer. The mirror may, of course, be mounted on any of a plurality of devices which are able provide oscillatory rotational motion, for example piezoelectric or magneto inductive devices.

The beam splitting device 40 sequentially redirects the laser beams 3 onto further redirecting mirrors 43 as desired. The redirecting mirrors 43 direct the laser beams 3 toward the focusing lenses 4 housed in the lens assemblies 31, and are arranged such that the overall path lengths of the beams 3 between the mirror assembly 6 and the focusing lenses 3 are equal.

Thus, the optical characteristics of the of laser beams 3 are the same regardless of which of the focusing lenses they emerge from and the beneficial characteristics described above can be provided on multiple targets by a compact apparatus.

What is claimed is:

1. Laser apparatus comprising a plurality of individual lasers, each of the lasers having an output end from which a laser beam is emitted along a corresponding path, and the lasers being mounted at angles to one another whereby the beams cross, wherein:

said laser output ends being disposed closely adjacent to one another; and a plurality of laser beam redirectors disposed to intercept the laser beams emitted from the laser output ends, said laser beam redirectors being disposed to extend the length of the laser beam paths and decrease the angle between said laser beams, said laser beam redirectors being located between the laser output ends and a crossing point at which the beams cross.

2. Laser apparatus according to claim 1, further including steering mirrors in the beam paths to vary the angles between the laser beams.

3. Laser apparatus according to claim 1 further including at least one additional laser beam redirector located in the beam paths to alter at least one dimension of the apparatus.

4. Laser apparatus according to claim 3, wherein the laser beam redirectors comprise mirrors.

5. Laser apparatus according to claim 3, wherein the laser beam redirectors comprise refractive optical prisms.

6. Laser beam apparatus according to claim 1, further comprising a laser beam splitting device in said laser beam paths for directing the laser beams to a plurality of targets.

7. Laser apparatus according to claim 1 further comprising a lens in the laser beam paths for focusing the laser beams onto a target surface.

8. Laser apparatus according to claim 7, wherein the lens is located between the point where the laser beams cross and the target surface, a distance f from the crossing point which is the focal length of the lens.

9. Laser beam apparatus according to claim 6, wherein the respective path lengths of the laser beams between the laser beam redirectors and each lens are equal.

10. Laser beam apparatus according to claim 3, wherein the additional redirector reduces the at least one dimensions of the apparatus.

* * * * *